Oct. 3, 1961

C. A. REDDELL 3,002,628

ROTATING POWER DRIVEN BASE

Filed Feb. 4, 1960

INVENTOR.
Charles A. Reddell
BY
His Attorney

United States Patent Office 3,002,628
Patented Oct. 3, 1961

3,002,628
ROTATING POWER DRIVEN BASE
Charles A. Reddell, San Bernardino, Calif., assignor to Warren Christmas Trees, Inc., San Bernardino, Calif., a corporation of Nevada
Filed Feb. 4, 1960, Ser. No. 6,646
5 Claims. (Cl. 211—1.6)

This invention relates to revolving display stand and the like and more particularly to power driven base supports used in conjunction therewith.

An object of the present invention is to provide a rotating power driven base of the character described which is of neat, attractive, and compact form and appearance; will provide efficient, low-cost, dependable and quiet operation; and is formed of a minimum number of sturdy and durable parts capable of affording very long and continuous use and even ordinarily contemplated abuse such as forced stalling of the device for protracted periods without danger or damage to the working parts.

Another object of the present invention is to provide a rotating power driven base of the character above which is readily adaptable for use with many types and styles of motion displays and other applications such as, for example a Lazy Susan and which is specially arranged to facilitate the interchange of various rotating displays on the base.

The invention possesses other objects and features of advantage, some of which of the foregoing will be set forth in the following description of the preferred form of the invention which is illustrated in the drawing accompanying and forming part of this specification. It is to be understood however, that variations in the showing made by the said drawing and description may be adopted within the scope of the invention as set forth in the claims.

Referring to said drawing (one sheet):

Figure 1:
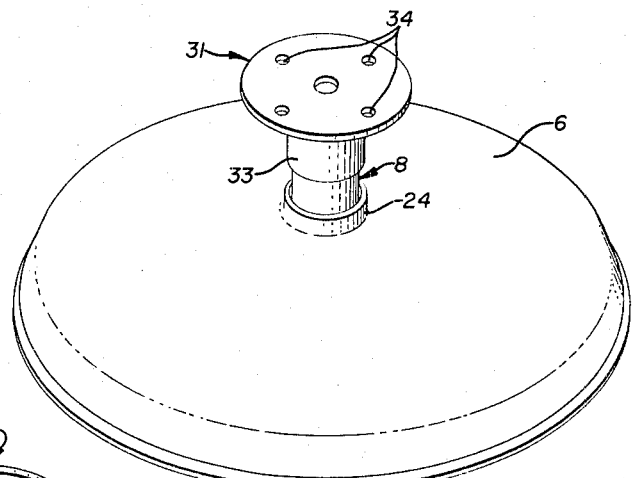
FIGURE 1 is a perspective view of a rotating power driven base constructed in accordance with the present invention.

The rotating power driven base of the present invention consists briefly of a base member 6, a centrally positioned shaft 7 carried by and extending vertically upwardly from base member 6, a driven member 8 formed with a centrally axially extending sleeve bearing 9 journalled for rotation on shaft 7 and including an internal ring gear 11 surrounding shaft 7 in spaced concentric relation, an electric motor 12 carried by base member 6 in a vertical mounting of the motor shaft 13, and a pinion 14 enmeshed with ring gear 11. Preferably sleeve bearing 9 is here provided by a tubular part or portion 16 of the driven member 8 and vertical support for the driven member is provided by resting the lower end 17 of tubular portion 16 upon a thrust bearing 18 carried by the base member 6 in surrounding concentric relation to shaft 7.

As a feature of the present invention, the driven member 8 is here formed with its several parts and portions above described integrally fashioned in a one-piece plastic member composed of spaced inner and outer concentric shells 16 and 21 interconnected by a plurality of radial ribs 22. Outer shell 21 here provides the internal concentric surface formed with integral ring gear teeth therein, thus providing durable quietly operating plastic gear teeth for engagement with the gear teeth on pinion 14.

Figure 2:
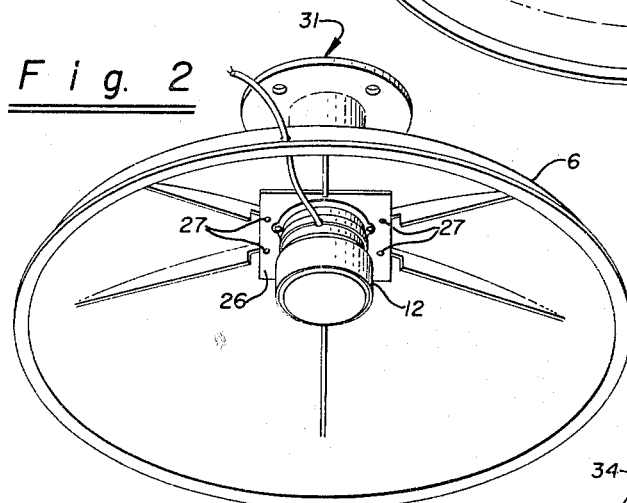
FIGURE 2 is a bottom perspective view of the base.
Figure 4:
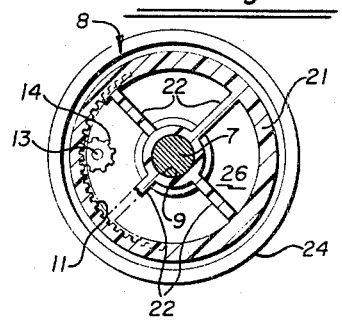
FIGURE 4 is a fragmentary cross-sectional view on a further enlarged scale taken substantially on the plane of line 4—4 of FIGURE 3.
Figure 3:
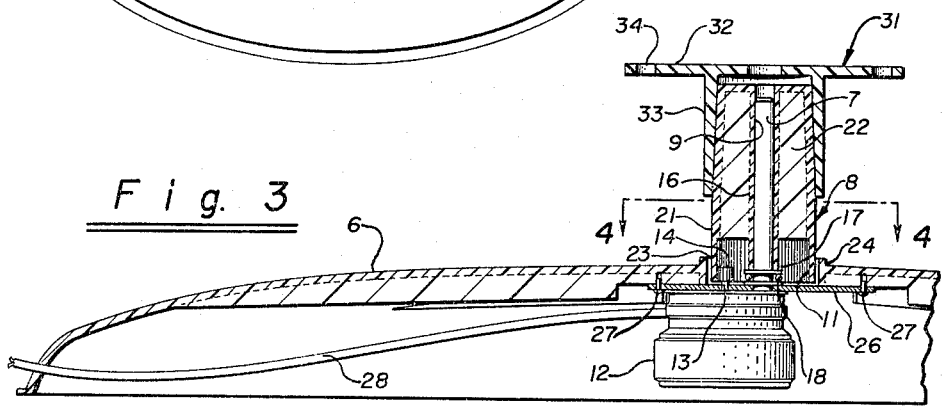
FIGURE 3 is a fragmentary, cross-sectional view of the base on a somewhat enlarged scale.

Preferably, also, the base member 6 is formed as a one-piece plastic member and of inverted dish-shaped form. Conveniently, a central vertical opening 23 is provided in the top of the base member and is here defined within an upstanding integral cylindrical collar 24. Shaft 7 and motor 12 are here assembled to base member 6 by means of a mounting plate 26 secured as by rivets 27 across the underside of base 6 at the upper center thereof, thus providing a bottom closure for opening 23. Shaft 7 is fixed to plate 26 to project upwardly therefrom centrally of opening 23 and collar 24. Thrust bearing 18 is here composed of annular ball bearing race which is slipped down over shaft 7 and mounted upon the upper surface of plate 26. Thus, as above explained, the central tubular portion 16 of the driven member finds a vertical support for its lower end face 17 upon the thrust bearing 18 to thus support the driven member for rotation centrally within opening 23 and with the lower end of the outer cylindrical shell 21 being received within and enclosed by collar 24. Electric motor 12 is secured to plate 26 eccentric to shaft 7 so as to position motor shaft 13 and pinion 14 thereon for proper engagement with the teeth of ring gear 11. An electric cord 28 for motor 12 may be led off through an opening in the base as illustrated in FIGURES 2 and 3.

Preferably, in order to facilitate the wide usage of the device and ease in interchanging various rotating displays, the proper end section of the external cylindrical shell 16 of the driven member is formed with an external frusto-conical shape, and a display mounting member 31 is provided with a horizontally arranged display mounting flange 32 and a centrally depending tubular portion 33 dimensioned for demountably and slidably embracing the tapered upper end section of shell 21. Flange 32 is preferably provided with one or more openings 34 to aid in securing thereto the base of various displays which may be supported and rotated by the unit of the present invention. As will be seen the mounting member 31 may be easily lifted off from the driven member 8 or slipped thereupon as required. Also, the driven member 8 itself may be easily and simply lifted off from shaft 7 with the teeth of the ring gear 11 sliding freely axially from the teeth of pinion 14, and the driven member may with equal facility be replaced in operating position. These features permit the ready adaptation of the unit to various motion display uses. One adaptation is for a revolving Christmas tree base. Another is for various revolving display stands in stores. Still another is for a Lazy Susan food server and display unit designed for positioning at the center of a dining table in which case the Lazy Susan may be continuously in motion or arranged for starting and stopping with the provision of one or more electric switches connected to motor 12. Motor 12 may be one of the low cost dependable, quiet, synchronous electric clock motors which are available on the market and which affords the added advantage that it may be stalled for long periods of time without damage.

I claim:

1. A rotating power driven base comprising, an inverted dish-shaped base member having an upwardly convex wall, a stationary vertical shaft carried by and extending upwardly from said wall centrally of said base member, a driven member formed with a central tubular portion journalled for rotation on said shaft and a surrounding concentric cylindrical wall formed with internal ring-gear teeth, an electric motor secured to said base member at the under side of said wall in a vertical mounting of the motor shaft and with the upper end of said motor shaft located between said stationary shaft and said cylindrical wall of said driven member, and a pinion on said upper end of said motor shaft enmeshed with said ring gear teeth.

2. A rotating power driven base comprising, an inverted dish-shaped molded plastic base member having an upwardly convex wall, formed with an integral upstanding centrally arranged circular collar, a stationary vertical shaft carried by and extending upwardly from said wall centrally of said collar, a thrust bearing member carried by said base member in surrounding relation to said shaft, a driven member formed of one-piece molded plastic with a central tubular portion journalled for rotation on said shaft and having a lower end portion supported for rotation on said thrust bearing, said driven member also having an integral cylindrical wall concentrically surrounding said tubular portion received within said collar and being formed with internal ring-gear teeth, an electric motor secured to said base member at the under side of said wall in a vertical mounting of the motor shaft and with the upper end of said motor shaft located between said stationary shaft and said cylindrical wall of said driven member, and a pinion on said upper end of said motor shaft enmeshed with said ring gear teeth.

3. A rotating power driven base as characterized in claim 2 wherein an upper end section of said cylindrical wall of said driven member is formed with an external frusto-conical shape, and a display mounting member provided with a horizontally arranged display mounting flange and a centrally depending tubular portion demountably and slidably embracing said upper end section of said cylindrical wall.

4. A rotating power driven base comprising, an inverted dish-shaped base member having an upwardly convex wall formed with a top opening, a mounting plate secured to the under side of said wall across said opening and perpendicular to the axis thereof, a stationary vertical shaft carried by said plate and projecting upwardly therefrom centrally through said opening, a driven member formed with a central tubular portion supported on said plate and surrounding and journalled for rotation on said shaft and a surrounding concentric cylindrical wall formed with internal ring-gear teeth, an electric motor secured to said plate in a vertical mounting of the motor shaft and with the upper end of said motor shaft located between said stationary shaft and said cylindrical wall of said driven member, and a pinion on said upper end of said motor shaft enmeshed with said ring gear teeth.

5. A rotating power driven base comprising, an inverted dish-shaped base member having an upwardly convex wall formed with a top opening, a mounting plate secured to the under side of said wall across said opening and perpendicular ot the axis thereof, a stationary vertical shaft carried by said plate and projecting upwardly therefrom centrally through said opening, a thrust bearing mounted on said plate around said shaft, a driven member composed of spaced integrally connected inner and outer concentric shells, said inner shell providing a central tubular portion journalled for rotation on said shaft and having a lower end supported on said thrust bearing, the inside wall of said outer shell being formed with internal ring-gear teeth, an electric motor secured to said plate in an eccentric vertical mounting of the motor shaft and with the upper end of said motor shaft located between said staitonary shaft and said outer shell, and a pinion on said upper end of said motor shaft enmeshed with said ring gear teeth.

References Cited in the file of this patent

UNITED STATES PATENTS

| | | |
|---|---|---|
| 869,058 | Callan | Oct. 12, 1907 |
| 1,655,768 | Jones | Jan. 10, 1928 |
| 2,005,293 | Harris et al. | June 18, 1935 |
| 2,280,684 | Bronner | Apr. 21, 1942 |